Aug. 24, 1926.  1,597,094
F. G. MANLY
ROLLER CONVEYER TRUCK LOADING AND UNLOADING DEVICE
Filed Feb. 28, 1925   2 Sheets-Sheet 1
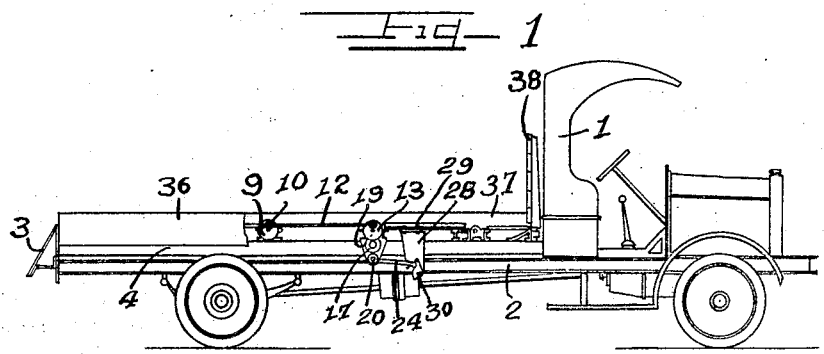
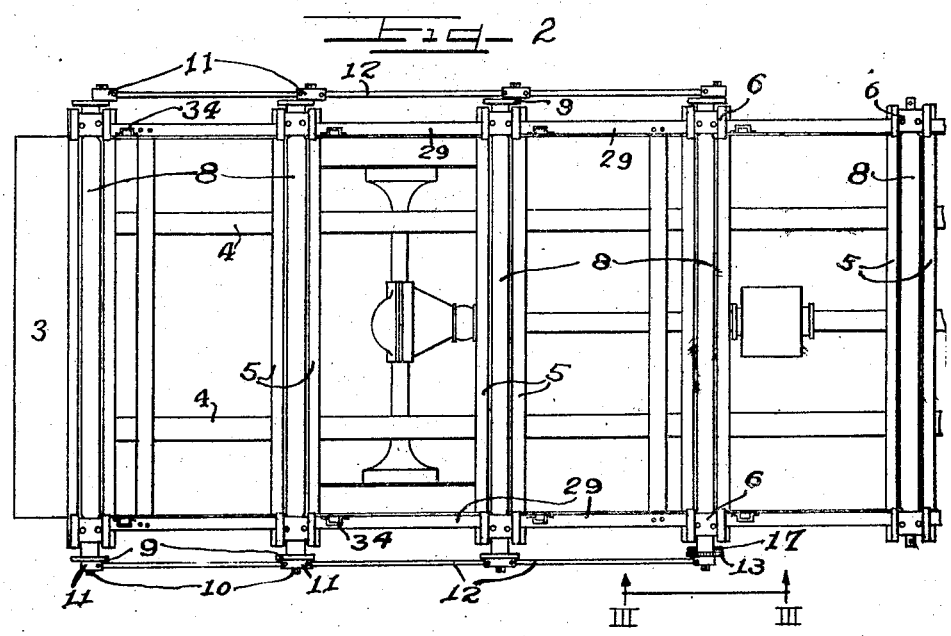
Inventor
Fred G. Manly
by Charles H. Willey
Attys.

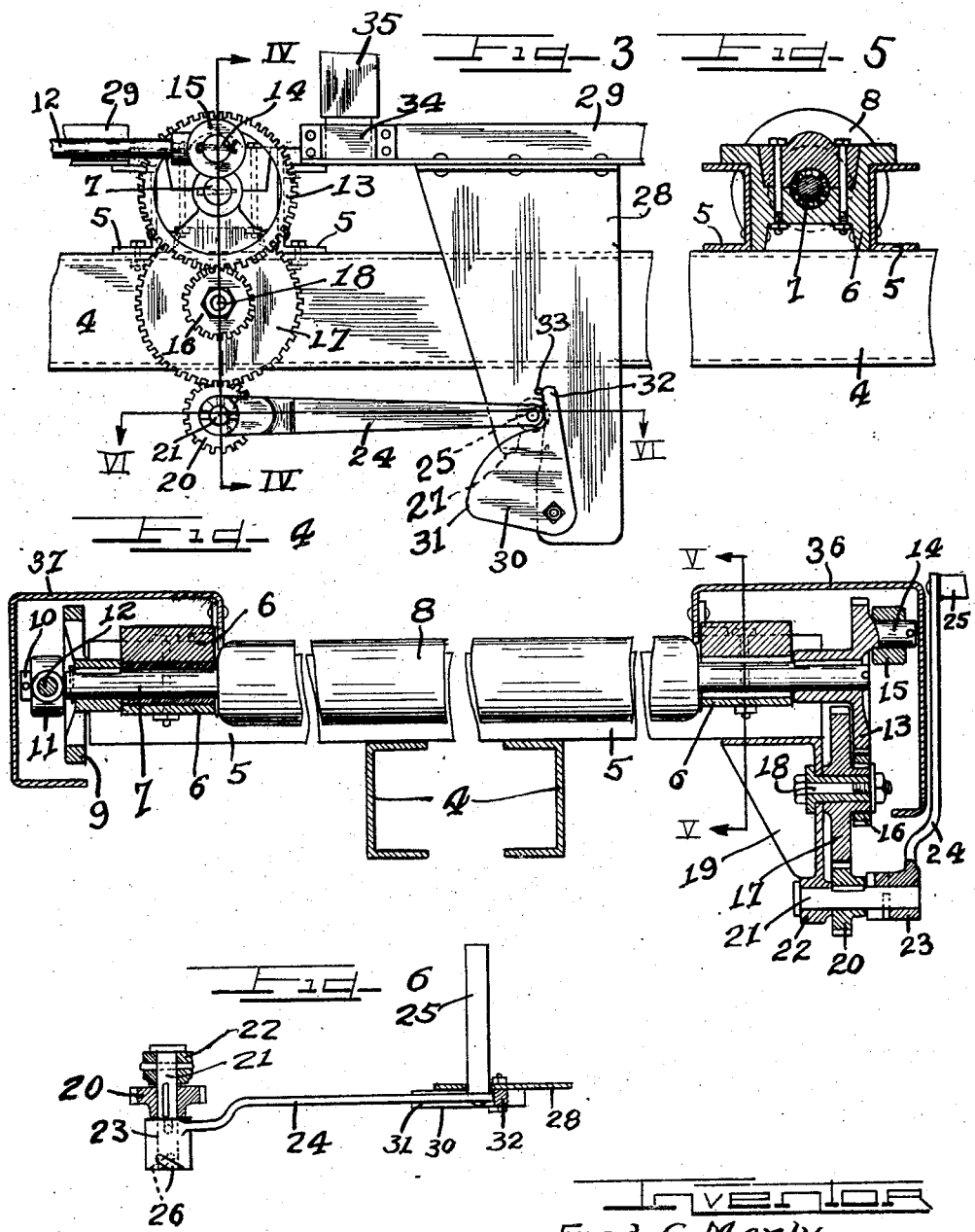

Patented Aug. 24, 1926.

1,597,094

UNITED STATES PATENT OFFICE.

FRED G. MANLY, OF CHICAGO, ILLINOIS.

ROLLER-CONVEYER TRUCK LOADING AND UNLOADING DEVICE.

Application filed February 28, 1925. Serial No. 12,198.

In equipping trucks with roller conveyer devices for loading and unloading the trucks it has been the practice to drive the top rollers by means of a plurality of continuous chains and sprocket arrangements or intermeshing gears. These arrangements at present in operation are not satisfactory for the reason that the slack in the chains is difficult to control and the gear drives are expensive and complicated.

This invention relates to an improved roller conveyer mechanism comprising a plurality of rollers all of which are adapted to be simultaneously operated by crank or eccentric driving means.

It is an object of this invention to provide a truck with a loading mechanism which may be conveniently operated by a single person through crank driving means.

It is also an object of this invention to provide a roller conveyer mechanism wherein all of the rollers are eccentrically connected by means of connecting rods.

It is an important object of this invention to provide a roller conveyer having the rollers thereof connected to a common manually operable driving mechanism adapted to simultaneously operate a plurality of connected driving rods which are pivotally connected to the respective rollers of the conveyer device.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a motor truck with the side board partly broken away to illustrate a portion of the roller conveyer embodying the principles of this invention.

Figure 2 is an enlarged top plan view of the roller conveyer device shown in position upon the rear portion of the truck chassis.

Figure 3 is an enlarged fragmentary side elevation of the driving mechanism for the roller conveyer taken on line III—III of Figure 2.

Figure 4 is a transverse fragmentary detail section taken on line IV—IV of Figure 3.

Figure 5 is a fragmentary detail section taken on line V—V of Figure 4.

Figure 6 is a fragmentary detail taken on line VI—VI of Figure 3 with parts shown in elevation.

As shown on the drawings:

The reference numeral 1 indicates a motor truck provided with a chassis frame 2 on the end of which a tail board 3 is mounted. Supported upon the chassis are a pair of longitudinally disposed channel bars or sills 4 having transversely mounted on the top thereof a plurality of pairs of transverse channel bars 5 which extend beyond the sills 4 and have bearing brackets 6 rigidly secured between the outer ends thereof. Rotatably supported in suitable roller bearings in each set or pair of the bearing brackets 6 are the shaft ends 7 of the rollers 8.

As illustrated in Figure 2 the four rear rollers comprise the loading and unloading mechanism and are adapted to be operated simultaneously by a one man mechanism. Keyed or otherwise secured on the ends of the shaft sections 7 are disks or wheels 9 each of which has secured thereto an eccentric pin 10 on which a collar or sleeve 11 is pivotally supported. Connecting the various eccentric sleeves 11 are connecting rods 12 as illustrated in Figure 2 affording a mechanism whereby all of the conveyer mechanism rollers 8 may be simultaneously rotated. As shown in Figure 2 all but one of the ends of the rollers is equipped with a disk 9. The driving mechanism is connected to one of the shaft sections 7 of one of the rollers and is clearly illustrated in Figures 3 and 4. Keyed or otherwise secured on the particular roller shaft 7 is a driving gear 13 having an eccentric pin 14 on which a collar or sleeve 15 is rotatably engaged. One end of one of the connecting rods 12 is connected to the eccentric roller 15 to receive a drive from the gear 13. Meshing with the large gear 13 is a pinion 16 which is secured on the hub of a larger gear 17. The gear 17 is rotatably supported on a stub bolt or shaft 18 which in turn is supported on a bracket 19 secured to the bottom of two of the transverse angle bars 5. The gear 17 is in mesh with a driving pinion 20 which is keyed upon a stub shaft 21 supported in a bearing 22 formed on the lower end of the bracket 19 (Figure 4). The stub shaft 21 projects through the bearing 22 and has removably engaged on the outer end thereof a sleeve 23 which is formed on one end of a crank arm 24. A handle 25 is engaged on the other end of the crank arm 24 to facilitate rotation thereof. The crank arm sleeve 23 is provided with worm slots 26 to coact with pins on the shaft 21.

When the roller conveyer mechanism is not in use the crank arm 24 is removed from the stub shaft 21 and is turned around and remounted on said stub shaft in a reversed position as illustrated in Figure 6 so that the crank handle 25 may be projected inwardly through a notch 27 in a supporting plate or bracket 28. The bracket 28 is rigidly secured on the bottom of an angle bar 29. A plurality of such angle bars 29 is provided along both sides of the truck with the ends of said angle bars supported on the respective transverse channel bars 5. For the purpose of holding the crank arm in a released position with the handle 25 projecting inwardly through the bracket 28 as illustrated in Figure 3, a cam latch 30 is pivotally supported on the bracket 28 and is provided with a cam surface 31 and with a projecting finger 32. When the cam latch plate 30 is in its latching position as illustrated in Figure 3 the finger 32 on said latch plate is adapted to contact a stop pin 33 also mounted on the bracket 28. The cam latch plate 30 is thus adapted to be thrown into a latching position below the handle end of the crank arm 24 to hold the crank arm in an out of the way position to prevent operation of the driving gear mechanisms and the connecting rods 12 so that the loading and unloading rollers 8 of the roller conveyer mechanism are locked against rotation when the truck has been loaded so that there will be no shifting of the load longitudinally of the motor truck.

Secured to the outer faces of the angle bars 29 are straps or sockets 34 provided for the purpose of receiving the lower reduced ends of staves or upright bars 35 which serve to hold the load in place against transverse movement on the motor truck. Disposed longitudinally along one side of the motor truck frame is a metal guard casing 36 which is secured to brackets formed on the bearings 6 and serves as a protecting housing for the eccentric disks and the connecting rods 12 on one side of the truck. A similar guard casing 37 is provided on the opposite side of the motor truck for housing the eccentric disks 9 and the connecting rods 12 on that side of the machine.

The operation is as follows:

When it is desired to load a motor truck of the class described with a large heavy box or stack of lumber or similar material which is to be transported, the truck is backed up into a convenient position to permit one end of the stack of lumber or the box to be loaded, to be moved up over the rear portion or tail board 3 into engagement with the rear roller 8. The driver of the truck then disengages the handle from its reversed position as illustrated in Figure 6 and replaces the same on the stub shaft 21 with the handle portion 25 projecting outwardly away from the truck. The crank arm 24 is disengaged by merely engaging the finger piece 32 of the cam latching plate 30 to swing the cam latch plate into a released position whereby the crank arm 24 may swing downwardly to cause the handle 25 to move out of the latching notch 27. When the crank arm 24 is mounted in operating position as shown in Figure 4 and with the one end of the material to be loaded resting on the rear roller 8 the operator may manually rotate the crank arm 24 thereby causing rotation of the pinion 20 and the gears 17, 16 and 13 to cause a drive to be transmitted to one of the rollers 8. The connecting rods 12 being connected with the driving roller 8 as hereinbefore described, cause the drive to be simultaneously transmitted to all of the rollers 8 which comprise a part of the roller conveyer or loading mechanisms of this invention. When the rollers 8 are simultaneously operated the load will be advanced into position on the truck in the desired position. If desired the load may be advanced far enough to engage the front auxiliary roller 8 which is an idler roller and is not connected to be driven from the driving roller 8. The load is prevented from bumping the back of the driver's cab of the motor truck by an upright stop board or wall 38 mounted on the truck.

After the load has been loaded into position on the motor truck by means of the one man operated improved roller conveyer mechanism of this invention the crank arm 24 is removed from the shaft 21 and is reversed and is then swung into the position illustrated in Figure 3 with the handle 25 projecting through the notch 27. The cam latching plate 30 is then swung backwardly into the full line position of Figure 3 with the finger piece 32 contacting the stop pin 33. In this position of the crank arm 24 the gears are of course locked in position against rotation thereby also causing the loading rollers 8 to be locked against rotation so that the load cannot be shifted longitudinally of the motor truck. The side staves 35 of the motor truck serve to hold the load in position against transverse movement on the truck.

After the load has been delivered to its destination the driver, without any assistance, may unload the truck by unlatching the crank arm 24, reversing the same on the stub shaft 21 and turning the crank arm in a direction to permit the rollers 8 to rotate so that the load will be advanced rearwardly out of the motor truck onto a receiving platform or similar device positioned to receive the material which is unloaded.

It will thus be seen that the improved roller conveyer mechanism of this invention may be easily operated by a single person by means of the crank operated gear means which transmits a drive to all of the conveyer rollers simultaneously through the connecting rods which are eccentrically connected with the disks which are mounted on the ends of said rollers. The improved conveyer device is simple in construction and due to the fact that it may be operated by a single person is a great improvement over earlier truck loading devices.

The principle of the eccentric rod connecting means for roller conveyer drives need not of course be limtied to use on truck loading conveyers but is susceptible of a wide variety of applications.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. The combination with a motor truck, of a plurality of rollers transversely mounted thereon, gear means for simultaneously operating said rollers, a crank arm device for manually operating said gear means, a notched bracket on said truck adapted to receive said crank arm, and a latching member on said bracket adapted to hold the crank arm locked in an inoperative position to prevent operation of said gear means and to lock said rollers against operation.

2. The combination with a motor truck, of a plurality of rollers mounted thereon, disks connected with said rollers, a gear mechanism for simultaneously driving said rollers, a reversible crank arm to permit manual operation of said gear means, a handle on said crank arm, a notched bracket mounted on said motor truck adapted to receive said handle in the notch thereof when the crank arm is reversed, and a cam latching means on said bracket adapted to be moved into a position to hold the handle locked in said notch to prevent manual operation of the crank arm and said gear means so as to hold the rollers locked against rotation.

In testimony whereof I have hereunto subscribed my name.

FRED G. MANLY.